US009122289B2

(12) United States Patent
Howes

(10) Patent No.: US 9,122,289 B2
(45) Date of Patent: Sep. 1, 2015

(54) CIRCUIT TO CONTROL THE EFFECT OF DIELECTRIC ABSORPTION IN DYNAMIC VOLTAGE SCALING LOW DROPOUT REGULATOR

(71) Applicant: Dialog Semiconductor GmbH, Kirchheim/Teck-Nabern (DE)

(72) Inventor: Rupert Howes, Stroud (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 392 days.

(21) Appl. No.: 13/692,438

(22) Filed: Dec. 3, 2012

(65) Prior Publication Data

US 2014/0152279 A1 Jun. 5, 2014

(51) Int. Cl.
*H02M 3/157* (2006.01)
*G05F 1/10* (2006.01)

(52) U.S. Cl.
CPC .......................................... *G05F 1/10* (2013.01)

(58) Field of Classification Search
CPC .............................. H02M 3/156; H02M 3/157
USPC .................................................. 323/273, 274
See application file for complete search history.

(56) References Cited

U.S. PATENT DOCUMENTS

| | | | | |
|---|---|---|---|---|
| 4,023,097 | A | 5/1977 | Hanashey | |
| 4,211,981 | A | 7/1980 | Lerma | |
| 5,519,328 | A | 5/1996 | Bennett | |
| 5,557,242 | A | 9/1996 | Wetherell | |
| 6,294,945 | B1 | 9/2001 | Regier et al. | |
| 7,816,955 | B2 | 10/2010 | Takahashi et al. | |
| 8,471,539 | B2 * | 6/2013 | Wu | 323/275 |
| 8,917,069 | B2 * | 12/2014 | Howes et al. | 323/266 |
| 2007/0159146 | A1 * | 7/2007 | Mandal | 323/280 |
| 2011/0181257 | A1 * | 7/2011 | Pancholi et al. | 323/280 |
| 2012/0299564 | A1 | 11/2012 | Howes et al. | |
| 2014/0152279 | A1 * | 6/2014 | Howes | 323/273 |

OTHER PUBLICATIONS

"A Wide-Range Logarithmic Charge Digitizer," by A. Richard Zacher, IEEE Transactions on Circuits and Systems—1: Fundamental Theory and Applications, vol. 40, No. 5, May 1993, pp. 307-316.
"500 mA LDO Voltage Regulator," NCP5500, NCV5500, NCP5501, NCV5501, Semiconductor Coponents Industries, LLC, Aug. 2008, pp. 1-13, found http://onsemi.com.

* cited by examiner

*Primary Examiner* — Jeffrey Sterrett
(74) *Attorney, Agent, or Firm* — Saile Ackerman LLC; Stephen B. Ackerman; Billy Knowles

(57) ABSTRACT

A circuit and method provides compensation for disturbance of an output voltage caused by dielectric absorption of a load capacitor of a low dropout voltage regulator after a modification of the output voltage level of the low dropout voltage regulator. A dielectric absorption current compensation circuit generates a profile current that is applied to an output of the low dropout voltage regulator and in parallel with the load capacitor to compensate for the dielectric absorption current. The dielectric absorption current compensation circuit has a programmable profile current generator that generates the profile current. A switchable current mirror transfers a mirror profile compensation current to the load capacitor to compensate for the dielectric absorption current. In some embodiments, the profile current is a continuous profile dielectric absorption compensation current and in other embodiments, the profile current is a digital profile dielectric absorption compensation current.

22 Claims, 7 Drawing Sheets

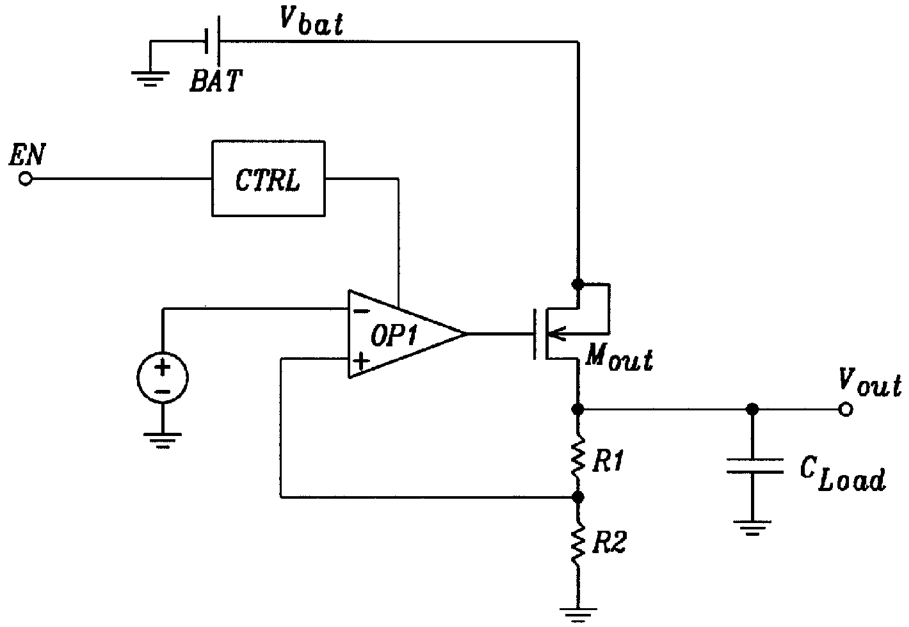
FIG. 1 – Prior Art
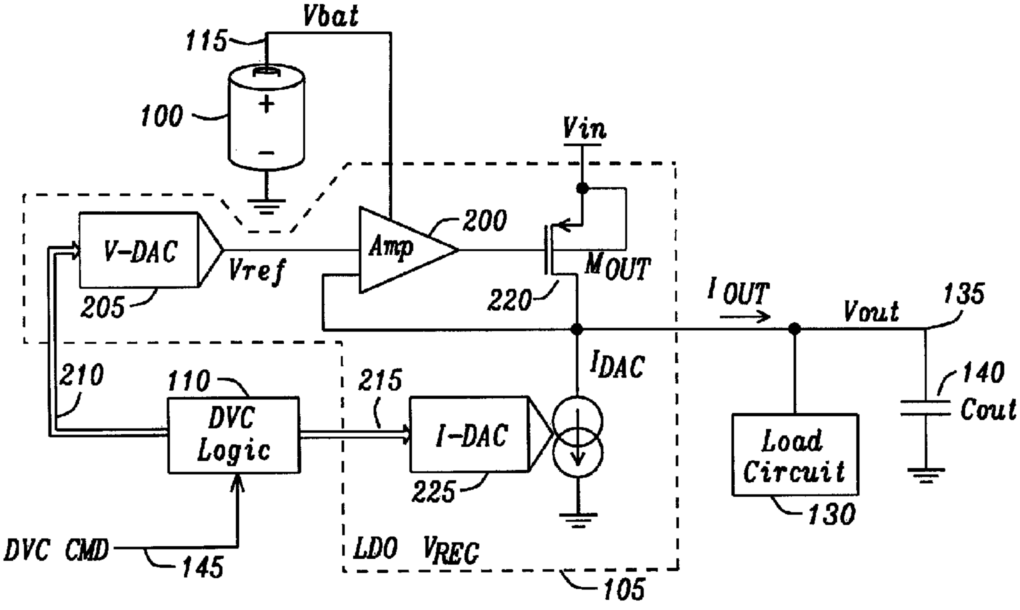
FIG. 2

CIRCUIT TO CONTROL THE EFFECT OF DIELECTRIC ABSORPTION IN DYNAMIC VOLTAGE SCALING LOW DROPOUT REGULATOR

RELATED PATENT APPLICATIONS

U.S. patent application Ser. No. 13/134,603 (Howes, et al.), filed on Jun. 10, 2011, assigned to the same assignee as the present invention, and incorporated herein by reference in its entirety.

TECHNICAL FIELD

This disclosure relates generally to voltage regulator circuits. More particularly, this disclosure relates to low dropout voltage regulator circuits. Even more particularly this disclosure relates to circuits and methods for correcting errors due to inherent dielectric absorption of output load capacitors of dynamic voltage control low dropout voltage regulator circuits.

BACKGROUND

Battery powered applications such as smart-phones and tablet computers demand long battery life and therefore highly power efficient circuits. Often, the power supply voltage of digital circuits for the battery power applications must be adjusted during operation to minimize power consumption, since the power dissipated is proportional to the square of the power supply voltage. To achieve the required speed of operation, a certain minimum supply voltage is required. As demand fluctuates, the supply voltage is adjusted as required.

The power supply for these types of circuits is often regulated down from the main battery by a voltage regulator, e.g. buck converter or linear regulator.

Buck voltage converters are generally power efficient but can consume a significant area and need bulky external components (inductors). These circuits are often used for higher load currents where the area of the control circuit is not significant compared with the size of the power switches.

However, for applications that require only a modest load current, the area penalty of a buck converter may be unacceptable. In such cases, the use of a low dropout voltage regulator (LDO) can be more area efficient although with some loss of energy efficiency.

A low dropout regulator is a class of linear regulator that is designed to minimize the saturation of the output pass transistor and its drive requirements. A low-dropout linear regulator will operate with input voltages only slightly higher than the desired output voltage. FIG. 1 is a schematic of a low dropout voltage regulator of the prior art. The main components of a low dropout voltage regulator are a power field effect transistor $M_{Out}$ having a source and bulk connected to a battery BAT to receive a battery voltage $V_{bat}$. The gate of the power field effect transistor $M_{Out}$ is connected to an output of a differential error amplifier Op1. One input of the differential error amplifier Op1 monitors the fraction of the output determined by the resistor ratio of R1 and R2. The second input to the differential error amplifier Op1 is from a stable voltage reference (bandgap reference) $V_{Ref}$. If the output voltage rises too high relative to the reference voltage $V_{Ref}$, the drive to the power field effect transistor $M_{Out}$ changes to maintain a constant output voltage $V_{Out}$ developed across the load capacitance $C_{Load}$.

Dielectric absorption, also called dielectric relaxation or capacitor soaking, is the tendency of a capacitor to recharge itself after being discharged. Dielectric absorption is also the dominant loss mechanism of the entire usable range of most capacitors that affect the performance of error amplifiers, digital-to-analog converters, other sample and hold circuitry, and switched capacitor circuitry. The load capacitance $C_{Load}$ of the low dropout regulator is a discrete capacitor that is subject to the dielectric absorption phenomena and will impact the functioning of the differential error amplifier Op1 to cause loss of regulation of the low dropout regulator.

SUMMARY

An object of this disclosure is to provide is to provide a circuit and method for compensating for dielectric absorption current of a load capacitor of a low dropout voltage regulator.

To accomplish at least this object, a dielectric absorption current compensation circuit generates a profile current that is applied to an output of the low dropout voltage regulator and in parallel with the load capacitor to compensate for the dielectric absorption current from recharging the load capacitor. In some embodiments, the dielectric absorption current compensation circuit is an analog dielectric absorption current compensation circuit providing an analog profile compensation current mirroring the dielectric absorption current. In other embodiments, digital dielectric absorption current compensation circuit providing a digital profile compensation current having discrete levels approximately mirroring the dielectric absorption current.

The analog dielectric absorption current compensation circuit has a programmable profile current generator that generates the profile current. A switchable current mirror transfers a mirror profile current to the load capacitor to compensate for the dielectric absorption current. The switchable current mirror has a first switch with a first terminal connected to an output of the programmable current source and a second terminal connected to a drain and gate of a diode-connected transistor. A source of the diode-connected transistor is connected to a ground reference voltage source. A ballast timing capacitor has a first plate connected to the drain and gate of the diode-connected transistor and a second plate connected to the ground reference voltage source to control the profile of the compensating current within the dielectric absorption compensation circuit.

A second switch has a first terminal connected to the drain and gate of the diode-connected transistor and second terminal connected to a gate of a second transistor. The drain of the second transistor is connected to an output of the low dropout regulator and in parallel with the output capacitor of the low dropout regulator. A source of the second transistor is connected to the ground reference voltage source. A third switch has a first terminal connected to the gate of the second transistor and the second terminal of the second switch and a second terminal connected to the ground reference voltage source.

When the low dropout regulator is in a steady state condition, the first switch is activated to close the connection from the profile current source to the diode-connected transistor. The second switch is deactivated to disconnect the gate of the second transistor from the drain and gate of the diode-connected transistor. The third switch is activated to connect the gate of the second transistor to the ground reference voltage source.

When the output of the low dropout regulator is programmed to lower voltage level, the output voltage level is brought to the lower voltage level. At this time, the voltage across the output capacitor of the low dropout voltage regulator will begin to recharge and the output voltage will begin to rise. At this time the first switch and the third switch will deactivate and second switch will activate. The analog profile compensation current source will source current with a magnitude that matches the current generated as the output capacitor recharges. The switchable current mirror will provide the mirrored profile current to the output of the low dropout regulator to counteract the current generated by the recharging of the output capacitor.

The digital dielectric absorption current compensation circuit includes a digital-to-analog circuit that receive multiple data bits and generates the digital profile compensation current based on a data state of the data bits. The digital profile compensation current level is generated as the sum of the current levels based on a data state of applied to the data bits. The digital-to-analog circuit has multiple switching transistors that are connected such that a gate of each of the switching transistors receives one of the data bits. The sources of the switching transistors are commonly connected to a ground reference voltage source. A first terminal of each of multiple current determining resistors is connected to a drain of each of the plurality of switching transistors. The second terminals of the current determining resistors are commonly connected to the output of the low dropout voltage regulator for transferring the digital profile compensation current to the load capacitor to compensate for the dielectric absorption current.

When all of the data bits are at a first data state all of the plurality of switching transistors are turned on and the digital profile compensation current is a maximum current level. When all of the data bits are at a second data state all of the plurality of switching transistors are turned off and the digital profile compensation current is a zero current level. When any of the data bits are at a first data state those of the plurality of switching transistors with gates at the first data state are turned on, those of the switching transistors with gates at the second data state are turned off, and the digital profile compensation current is a current level equal to the sum of the current through each of those of the plurality of switching transistors with gates at the first data state and turned on. The digital profile compensation current is formed by selectively setting the data bits to the first data state to approximate the dielectric absorption current.

In some embodiments, at least this object is accomplished by a low dropout voltage regulator including a dielectric absorption current compensation circuit that generates a profile current that is applied to an output of the low dropout voltage regulator and in parallel with the output load capacitor of the low dropout voltage regulator to compensate for the dielectric absorption current of the recharging of the output load capacitor. In some embodiments, the dielectric absorption current compensation circuit is an analog dielectric absorption current compensation circuit providing an analog profile compensation current mirroring the dielectric absorption current. In other embodiments, digital dielectric absorption current compensation circuit providing a digital profile compensation current having discrete levels approximately mirroring the dielectric absorption current.

The analog dielectric absorption current compensation circuit has a profile current generator connected to a switchable current mirror circuit to provide a profile current that mirrors the dielectric absorption recharging current of the output load capacitor of the low dropout regulator. The switchable current generator is deactivated when the low dropout voltage regulator is in a steady state condition (output voltage not changing). It is activated after the low dropout voltage regulator has been programmed to a lower voltage and the output voltage has been reduced. After the output voltage has been reduced, the output load capacitor begins to recharge and the voltage across the output load capacitor begins to rise. To compensate for the recharging voltage, the switchable current source is activated and a mirrored version of the profile current is applied to the output of the low dropout voltage regulator to compensate for the dielectric absorption current of the recharging output load capacitor.

The analog dielectric absorption current compensation circuit has a programmable current source that alters the voltage and therefore the charge stored on a ballast timing capacitor. During normal operation, a first switch is activated to connect the programmable current source to the ballast timing capacitor for charging the ballast timing capacitor to a voltage limited by a diode-connected transistor with the switchable current source. A second switch within the switchable current source is deactivated and a third switch within switchable current source is activated to connect the gate of a second transistor of the switchable current source to the ground reference voltage level to turn off the second transistor. The amount of charge and the voltage level stored on the ballast timing capacitor determines the magnitude of the analog profile compensation current. The higher the voltage level present on the ballast timing capacitor, the greater the analog profile compensation current.

When the analog dielectric absorption current compensation circuit is activated, the first and the third switches are opened and the second switch is closed. The analog compensation current in the second transistor is activated to a current level that is approximately equivalent to the level of the dielectric absorption current caused during the recharging of the output capacitor due to the dielectric absorption. The diode-connected transistor and the second transistor function as a current mirror to provide the analog compensation current to maintain the output voltage level at the output terminal of the low dropout voltage regulator at the disabled voltage level. The ballast timing capacitor is used to control the timing profile for the analog compensation current flowing through the second transistor. When the analog dielectric absorption compensation circuit is activated, the ballast timing capacitor is gradually discharged through the diode-connected transistor. Since the analog compensation current decays over time due to the discharge of ballast timing capacitor through diode-connected transistor, a higher analog compensation current also corresponds to a greater total amount of compensation charge removed from the external capacitor because it takes longer for ballast timing capacitor to be fully discharged.

The digital dielectric absorption current compensation circuit includes a digital-to-analog circuit that receive multiple data bits and generates the digital profile compensation current based on a data state of the data bits. The digital profile compensation current level is generated as the sum of the current levels based on a data state of applied to the data bits. The digital-to-analog circuit has multiple switching transistors that are connected such that a gate of each of the switching transistors receives one of the data bits. The sources of the switching transistors are commonly connected to a ground reference voltage source. A first terminal of each of multiple current determining resistors is connected to a drain of each of the plurality of switching transistors. The second terminals of the current determining resistors are commonly connected to the output of the low dropout voltage regulator for transferring the digital profile compensation current to the load capacitor to compensate for the dielectric absorption current.

When all of the data bits are at a first data state, all of the switching transistors are turned on and the digital profile compensation current is a maximum current level. When all of the data bits are at a second data state all of the plurality of switching transistors are turned off and the digital profile compensation current is a zero current level. When any of the data bits are at a first data state those of the plurality of switching transistors with gates at the first data state are turned on, those of the switching transistors with gates at the second data state are turned off, and the digital profile compensation current is a current level equal to the sum of the current through each of those of the plurality of switching transistors with gates at the first data state and turned on. The digital profile compensation current is formed by selectively setting the data bits to the first data state to approximate the dielectric absorption current.

In some embodiments, at least this object is accomplished by an apparatus performing a method for compensating for the dielectric absorption current from the recharging of the output load capacitor of a low dropout voltage regulator. The low dropout voltage regulator is requested to decrease its output voltage. An internal load current source is enabled to decrease the output voltage of the low dropout voltage regulator by adjusting the charge of the output load capacitor. The output voltage of the low dropout voltage regulator is ramped down until it brought to a lower voltage level and the internal load voltage source is disabled. A profile current is applied after the low dropout voltage regulator is disabled to counteract the dielectric absorption current of the recharging output load capacitor to prevent the low dropout voltage regulator from becoming unregulated.

BRIEF DESCRIPTION OF THE DRAWINGS

FIG. 1 is a schematic of a low dropout voltage regulator of the prior art.

FIG. 2 is a schematic diagram of Howes, et al. of a battery driven power supply including a low dropout voltage regulator with dynamic voltage control.

DETAILED DESCRIPTION

Figure 3:
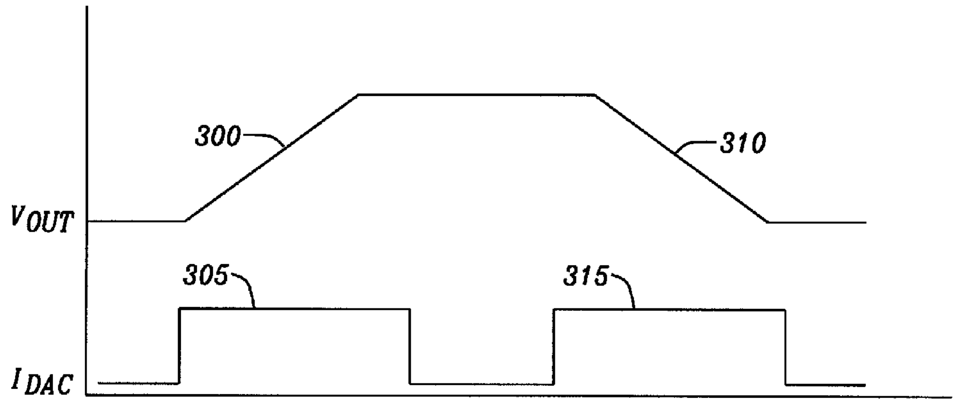
FIG. 3 is a plot of the timing of the output voltage level of the low dropout voltage regulator and the current of the dynamic voltage control current source of Howes, et al.

Howes, et al. provides low dropout voltage regulator circuit in which the output voltage can be dynamically increased or decreased in response to a system request. This increase or decrease must be achieved rapidly. The circuit requires no knowledge of the load current. To minimize battery power consumption, the output voltage level of the low-dropout voltage regulation circuit is dynamically adjusted depending on system requirements. To respond to a system request to increase or decrease the output voltage rapidly, which is normally required, the low dropout voltage regulator needs to have a high bandwidth. This requires high power dissipation. In the prior art, a dynamic bias scheme ensures that the quiescent current of the circuit is kept low and only increases when the output voltage is changed (programmed to a new value), which ensures the internal circuit bandwidth (poles) track the output bandwidth (pole). It is apparent that a high circuit bandwidth is achieved only with a high output load current.

In most embodiments of Howes, et al., the low dropout regulator does not require the output load current to be a particular value, but the circuit is forced into a high bandwidth state by applying an internal load current that increases the output pole. The dominant pole of the low dropout regulator is increased via dynamic current sensing. Once this high bandwidth state is reached, changing the reference voltage output from a voltage adjustment circuit such as a voltage digital-to-analog converter ramps the output voltage level up. At the end of the adjusting of the output voltage level, the internal load current may be switched off to save power. The internal load current may be maintained if another adjustment command is expected or a load transient is expected. In other embodiments, the internal load current may be maintained after the end of an adjustment of the output voltage level, but at a lower level. The internal load current for a modification of the output voltage level may be a function of the ramp rate required, the initial ramp voltage, or the end of ramp voltage. In other embodiments, the internal load current may be a function of the load capacitance. In some embodiments, the internal load current could be made a function of the system load current. The system load current is known from dynamic bias sense circuitry.

In various embodiments, the low dropout voltage regulator has a controlled ramp-rate from zero volts to the initial output target voltage during a power initialization by dynamically controlling the voltage adjustment circuit and the internal load current.

FIG. 2 is a schematic diagram of Howes, et al showing a battery 100 driven power supply including a low dropout voltage regulator 105 with dynamic voltage control 110. In the battery-powered systems such as the smart-phone or tablet computer, a power controller provides a power command 145 to indicate the voltage level necessary to be applied to circuitry within the system. During inactivity, many of the circuits within the system are disabled and are activated only during usage. On other occasions, some circuitry has the output voltage level 135 decreased to maintain a minimal performance level. When more performance is demanded the output voltage level 135 is increased to meet the demands of the higher performance. The battery 100 is connected to an amplifier gain stage 200 of the low dropout voltage regulator 105 to provide necessary power to the control circuitry of the low dropout voltage regulator 105. The input voltage Vin is from a switching voltage regulator that is the voltage applied to the output transistor 220 to generate the output voltage 135 from the low dropout voltage regulator 105. The power command signal 145 is the input to the dynamic voltage control circuit 110. A first output 215 of the dynamic voltage control circuit 110 is connected to adjustable internal load current source 225 of the low dropout voltage regulator 105 to provide a current adjustable internal load current source 225 indicating the voltage level and the rate of change ramping of the output voltage 135. A second output 210 of the dynamic voltage control 110 provides a reference voltage adjustment signal to a voltage digital-to-analog converter 205 to select the reference voltage level Vref for the amplifier 200.

The output voltage 135 is applied to output load capacitor 140 and the output load current source 130. A second input terminal of the first amplifier gain stage 200 is connected to the output terminal of the low dropout voltage regulator 105 to receive a slow feedback signal. The slow feedback signal from the output terminal of the low dropout voltage regulator 105 is compared to the reference voltage Vref supplied by the voltage digital-to-analog converter 205 to the amplifier gain stage 200 to develop a drive signal for the output transistor 220.

In order to rapidly adjust the voltage level Vout at the output terminal 135 of the low dropout voltage regulator 105, the internal bandwidth or dominant pole of the low dropout voltage regulator 105 must be increased. To accomplish this and to make the adjustment of the dominant pole independent of the load current 130, an adjustable internal load current source 225 is connected to the output terminal 135 of the low dropout voltage regulator 105. The dynamic voltage control circuit 110 has an output 215 connected to the adjustable internal load current source 225 to provide a current adjustment control signal The adjustable internal load current source 225 is a current digital-to-analog converter that receives the current adjustment control signal and provides the internal current to the source of the PMOS output transistor 220 to increase the pole of the output of the low dropout voltage regulator 105 and thus to its internal circuitry to allow the rapid adjustment of the output voltage level Vout at the output terminal 135.

The internal current output of the adjustable internal load current source 225 is maintained at a level pending another modification of the output voltage level or a transient change in the external load current 130. The load current of the adjustable internal load current source 225 is maintained at a lower level to conserve energy. The load current of the adjustable internal load current source 225 may be in various implementations, a function of the output load capacitance 140. The load current of the adjustable internal load current source 225 may be, in some implementations, a function of a ramp rate of the modification of the output voltage level.

FIG. 3 is a plot of the timing of the output voltage level of the low dropout voltage regulator and the current $I_{DAC}$ of the dynamic voltage control current source 225 of Howes, et al. To minimize the energy consumption from the battery 100, the output voltage level Vout of the low dropout voltage regulator 105 is dynamically adjusted depending on system requirements. To respond to the system request 335 to increase 300 or decrease 310 the output voltage level Vout at a fast rate the low dropout voltage regulator 105 needs to have a high bandwidth, which in turn requires a large bias current $I_{DAC}$ in the output transistor 220, hence the magnitude of the current $I_{DAC}$ of the adjustable internal load current source 225 is not insignificant. Therefore to keep the efficiency high when the output load circuit 130 is not sinking current, it is desirable to turn off 315 the adjustable internal load current source 225 soon after the end of the ramp down period 310.

Figure 4:
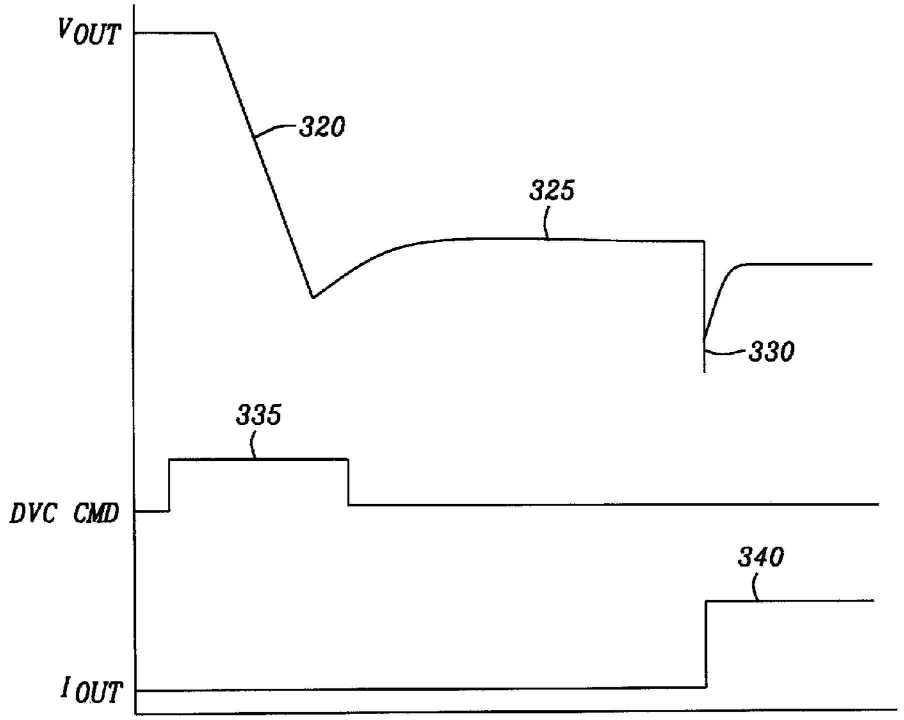
FIG. 4 is a plot of the output voltage response of the low dropout voltage regulator after dynamic voltage control current source ramp down with transient load current applied showing excessive transient load response of Howes, et al.

FIG. 4 is a plot of the output voltage response of the low dropout voltage regulator 105 after the dynamic voltage control current source 225 ramp down 315 with transient load current $I_{OUT}$ applied showing excessive transient load response of Howes, et al. The output capacitor $C_{OUT}$ is a discrete capacitor that can exhibit varying degrees of dielectric absorption after it has been discharged, where the dielectric continues to relax for some time afterwards. The excess charge can cause the output voltage level $V_{OUT}$ to increase 325 if the load circuit 130 is not sinking any current $I_{OUT}$. This can cause the low dropout voltage regulator 105 to go out of regulation and the biasing of the error amplifier 200 to become unbalanced. If a transient load is then applied (or a dynamic voltage control circuit 110 ramp up request is received requiring the dynamic voltage control current source 225 load to be applied), the low dropout voltage regulator 105 may be incorrectly biased to be able to respond quickly enough, with the result that the output voltage level $V_{OUT}$ can fall to an unacceptable level 330.

Figure 5:
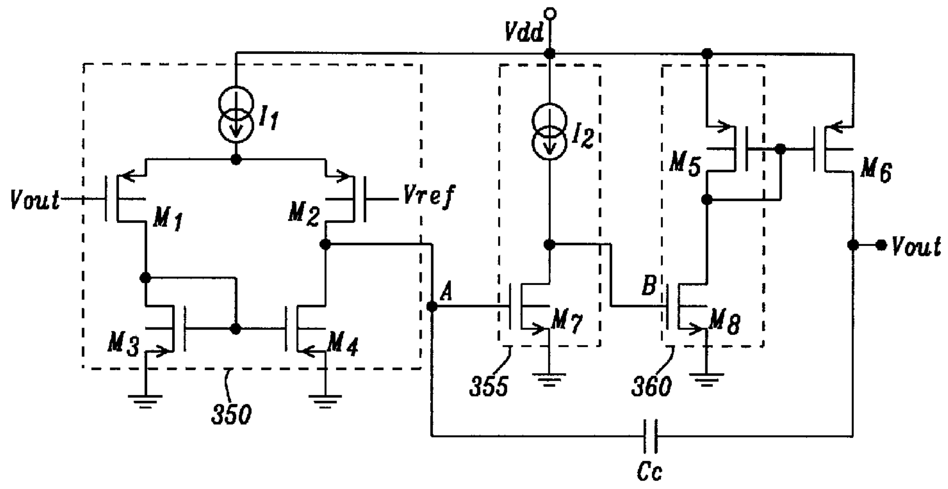
FIG. 5 is a schematic diagram of an error amplifier of the low dropout voltage regulator of FIG. 2.

FIG. 5 is a schematic diagram of an error amplifier 225 of the low dropout voltage regulator 105 of FIG. 2. Refer now to FIG. 5 to understand the behavior of the low dropout voltage regulator 105 during the dielectric relaxation period 325 of FIG. 4. The error amplifier 225 of the low dropout voltage regulator 105 of FIG. 2 as shown in FIG. 5 illustrates the first stage 350, the second stage 355, and the third stage or buffer stage 360 that form the error amplifier 225. When the output voltage level Vout is forced above the reference voltage Vref, the node A is forced high and node B is forced low shutting off the output transistor 220 completely. If a fast transient load current is now applied, the output voltage level $V_{OUT}$ will fall 325 of FIG. 4 significantly, since node A can only be discharged by the low bias current of the first stage 350 and the dynamic current through the feedback capacitor Cc.

Therefore, what is needed to solve the problem of the capacitor dielectric absorption current is a compensation circuit that will prevent the output voltage level $V_{OUT}$ rising 325 as in FIG. 4 and the node A of FIG. 5 from charging to prevent the output voltage level Vout from being forced above the reference voltage Vref. Thus the node A is not forced low and node B is kept high to prevent shutting off the output transistor 220 completely.

Figure 6:
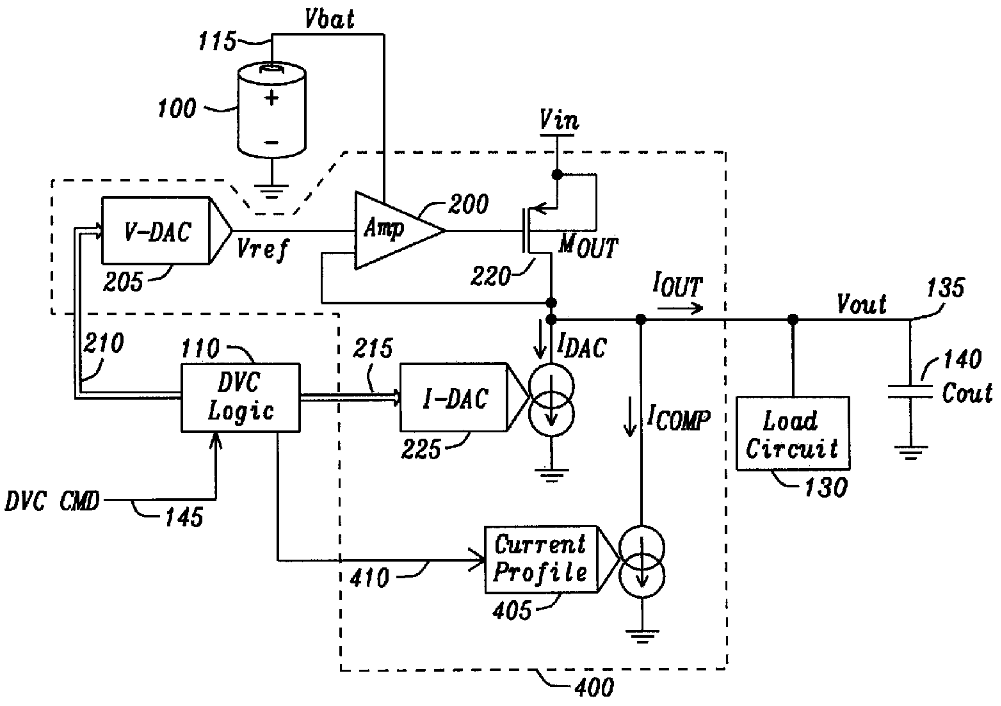
FIG. 6 is a schematic of an embodiment of a low dropout voltage regulator with dynamic voltage control including a dielectric absorption current compensation circuit of this disclosure.

FIG. 6 is a schematic of a low dropout voltage regulator 400 with a dynamic voltage control circuit 110 including a dielectric absorption current profile compensation circuit 405. The structure and function of the low dropout voltage regulator 400 with dynamic voltage control circuit 110 is as shown in FIG. 2. The dielectric absorption current profile compensation circuit 405 is connected to the dynamic voltage control circuit 110 to receive an activation signal when the adjustable internal load current source 225 is deactivated to generate a profile current to compensate for the capacitor dielectric absorption current. The output of the dielectric absorption current profile compensation circuit 405 is connected to the output of the low dropout voltage regulator 400 to provide the profile current to compensate for the relaxation current that develops when the output capacitor $C_{OUT}$ recharges resulting from dielectric absorption.

Figure 7:
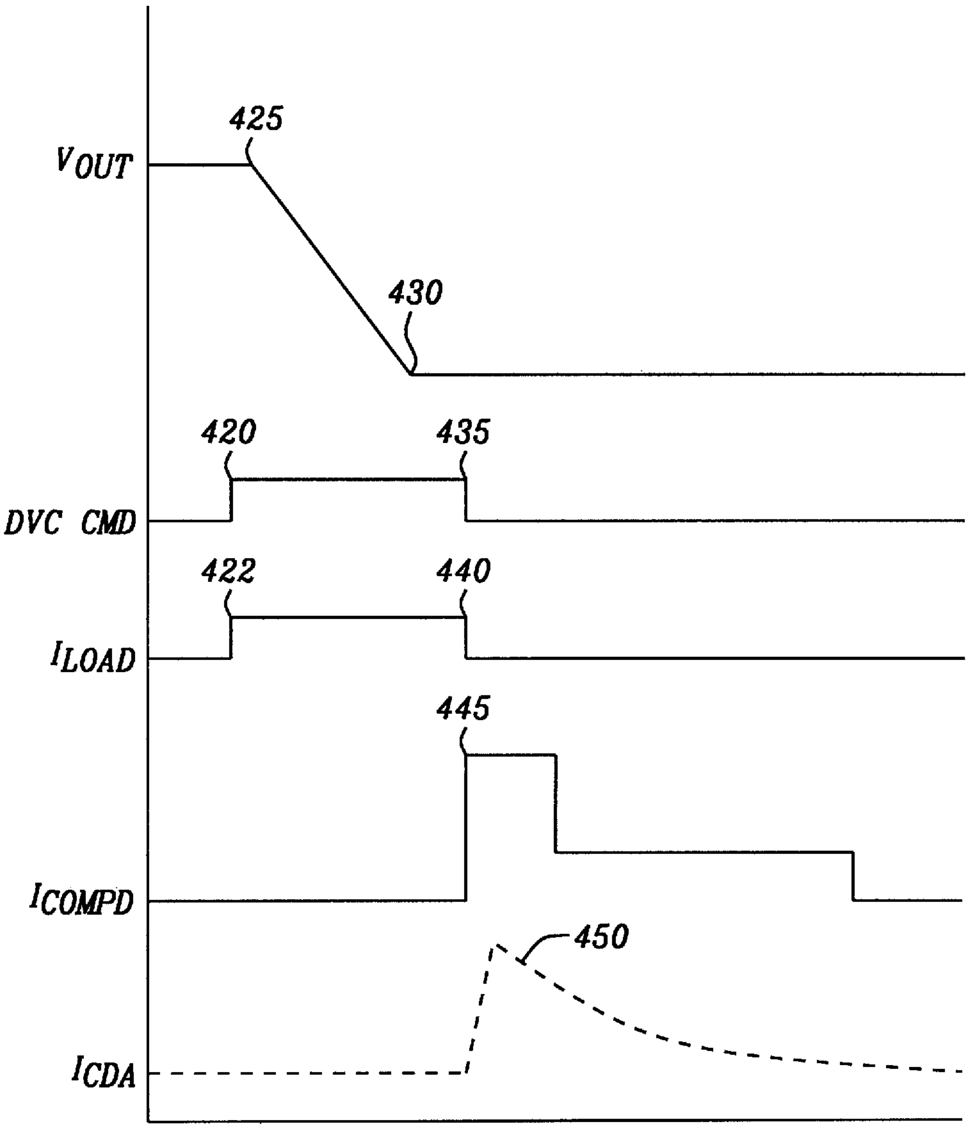
FIG. 7 is plot of the timing of the low dropout voltage regulator with dynamic voltage control including a dielectric absorption current compensation circuit of this disclosure.

FIG. 7 is plot of the timing of the low dropout voltage regulator 400 with dynamic voltage control 110 including a dielectric absorption current compensation circuit 405 of FIG. 6. A dynamic voltage control command signal 145 changes its state 420 to indicate that the output voltage level 135 is to decrease. The output voltage level $V_{OUT}$ at the output terminal 135 begins 425 to decrease. The dynamic voltage control logic circuit 110 activates the adjustable internal load current source 225 to maintain 422 the load current $I_{LOAD}$. When the output voltage level $V_{OUT}$ at the output terminal 135 has decreased to the minimum level 430, the dynamic voltage control command signal 145 changes state 435 again to deactivate the adjustable internal load current source 225 to turnoff 440 the load current $I_{LOAD}$.

The dielectric absorption current $I_{CDA}$ begins to flow 450 through the output voltage terminal 135 as the output load capacitor 140 begins to recharge because of dielectric absorption. The dielectric absorption current profile compensation circuit 405 is activated 445 to provide a digital profile compensation current $I_{COMPD}$. In various embodiments, this digital profile compensation current $I_{COMPD}$ has a digital profile that somewhat mirrors the dielectric absorption current $I_{CDA}$ such that when the digital profile compensation current $I_{COMPD}$ is added to the dielectric absorption current $I_{CDA}$ the output voltage level $V_{OUT}$ is held at the new lower level 430 and the error amplifier 200 is not incorrectly activated.

Figure 8:
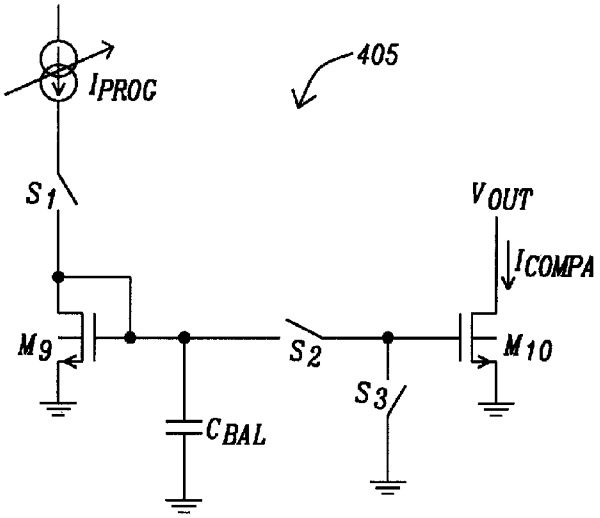
FIG. 8 is a schematic of the dielectric absorption current compensation circuit for implementing continuous time compensation for the capacitor dielectric absorption relaxation current of this disclosure.

FIG. 8 is a schematic of the dielectric absorption current compensation circuit 405 for implementing continuous time compensation for the capacitor dielectric absorption relaxation for the low dropout voltage regulator of FIG. 6. The dielectric absorption current compensation circuit 405 of FIG. 6 in various embodiments is structured as an analog dielectric absorption current compensation circuit shown in FIG. 8. A programmable current source $I_{PROG}$ is connected to one terminal of a first switch $S_1$. A second terminal of the first switch $S_1$ is connected to the drain and gate of the diode-connected transistor $M_9$. The source of the diode-connected transistor $M_9$ is connected to the ground reference voltage source. The commonly connected drain and gate of the diode-connected transistor $M_9$ is connected to a first plate of a ballast timing capacitor $C_{BAL}$. The second plate of the ballast timing capacitor $C_{BAL}$ is connected to the ground reference voltage source. The commonly connected drain and gate of the diode-connected transistor $M_9$ and the first plate of a ballast timing capacitor $C_{BAL}$ are connected to a first terminal of a second switch $S_2$. The second terminal of the second switch $S_2$ is connected to a gate of a second transistor $M_{10}$ and a first terminal of a third switch $S_3$. The second terminal of the third switch $S_3$ is connected to the ground reference voltage source. The source of the second transistor $M_{10}$ is also connected to the ground reference voltage source. The drain of the second transistor $M_{10}$ is connected to the output terminal 135 of the low dropout voltage regulator.

The programmable current source $I_{PROG}$ alters the voltage and therefore charge stored on the ballast timing capacitor $C_{BAL}$. During normal operation, the first switch $S_1$ is activated to connect the programmable current source $I_{PROG}$ to the ballast timing capacitor $C_{BAL}$ to charge the ballast timing capacitor $C_{BAL}$ to a voltage limited by the diode-connected transistor $M_9$. The second switch $S_2$ is deactivated and third switch $S_3$ is activated to connected the gate of the second transistor $M_{10}$ to the ground reference voltage level to turn off the second transistor $M_{10}$. The amount of charge and the voltage level stored on the ballast timing capacitor $C_{BAL}$ determines the magnitude of the analog profile compensation current $I_{COMPA}$. The higher the voltage level present on the ballast timing capacitor $C_{BAL}$, the greater the analog profile compensation current $I_{COMPA}$.

Figure 9:
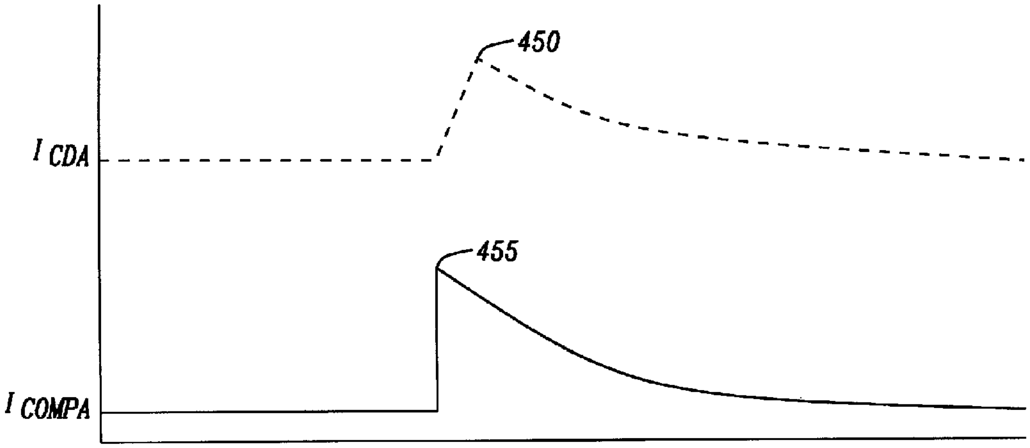
FIG. 9 is a plot comparing the continuous time profile current and dielectric absorption relaxation current of the capacitor dielectric absorption compensation circuit of the present disclosure.

FIG. 9 is a plot comparing the continuous time dielectric absorption relaxation current of the capacitor dielectric absorption compensation circuit 405. Referring to FIGS. 8 and 9, at the deactivation of the adjustable internal load current source 225 of FIG. 6, the first and third switches $S_1$ and $S_3$ are opened and the switch $S_2$ is closed. The analog compensation current $I_{COMPA}$ in the second transistor $M_{10}$ is activated to a current level 455 that is approximately equivalent to the level 450 of the dielectric absorption current $I_{CDA}$ caused during the recharging of the output capacitor $C_{OUT}$ due to the dielectric absorption. The diode-connected transistor $M_9$ and the second transistor $M_{10}$ function as a current mirror to provide the analog compensation current $I_{COMPA}$ to maintain the output voltage level $V_{OUT}$ at the output terminal of the low dropout voltage regulator at the disabled voltage level 430 of FIG. 7. The ballast timing capacitor $C_{BAL}$ is used to control the timing profile for the analog compensation current $I_{COMPA}$ flowing through the second transistor $M_{10}$. When the capacitor dielectric absorption compensation circuit 405 is activated, the first switch $S_1$ and the third switch $S_3$ is deactivated to be opened and the second switch $S_2$ is activated to be closed. The ballast timing capacitor $C_{BAL}$ is gradually discharged through the diode-connected transistor $M_9$. Since the analog compensation current $I_{COMPA}$ decays over time due to the discharge of ballast timing capacitor $C_{BAL}$ through diode-connected transistor $M_9$, a higher analog compensation current $I_{COMPA}$ also corresponds to a greater total amount of compensation charge removed from the external capacitor because it takes longer for ballast timing capacitor $C_{BAL}$ to be fully discharged.

In comparison, the digital profile compensation current $I_{COMPD}$ has discrete current levels that start at the higher level 445 and are discretely stepped down is increments to the zero current level. This is opposed to the analog compensation current $I_{COMPA}$ that follows an exponential discharge of the output capacitor $C_{OUT}$ after the recharging due to the dielectric absorption.

Figure 10:
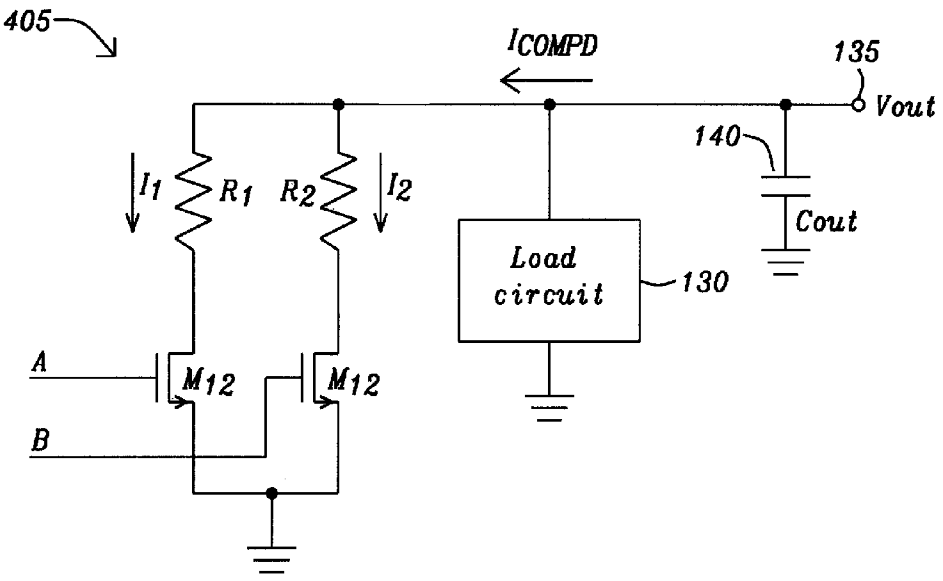
FIG. 10 is a schematic of the dielectric absorption current compensation circuit for implementing digital compensation for the capacitor dielectric absorption relaxation current of this disclosure.

FIG. 10 is a schematic of various embodiments of the digital dielectric absorption current compensation circuit 405 for implementing digital compensation of the capacitor dielectric absorption relaxation current of the low dropout voltage regulator of FIG. 6. The embodiment of the digital dielectric absorption current compensation circuit 405 has a first switching transistor $M_{11}$ and a second switching transistor $M_{12}$. The gate of the first switching transistor $M_{11}$ is connected to receive a first bit A of a logical signal. The drain of the first switching transistor $M_{11}$ is connected to a first terminal of a first current determining resistor $R_1$. The gate of the second switching transistor $M_{12}$ is connected to receive a second bit B of the logical signal. The drain of the second switching transistor $M_{12}$ is connected to a first terminal of a second current determining resistor $R_2$. The sources of the first switching transistor $M_{11}$ and the second switching transistor $M_{12}$ are commonly connected to the ground reference voltage source. A second terminal of each of the first current determining resistor $R_1$ and the second current determining resistor $R_2$ are commonly connected to the output voltage terminal 135 to receive the output voltage level $V_{OUT}$ and the voltage present at a top plate of the output capacitor $C_{OUT}$ and the top terminal of the load circuit 130 connected to the output terminal 135.

Figure 11:
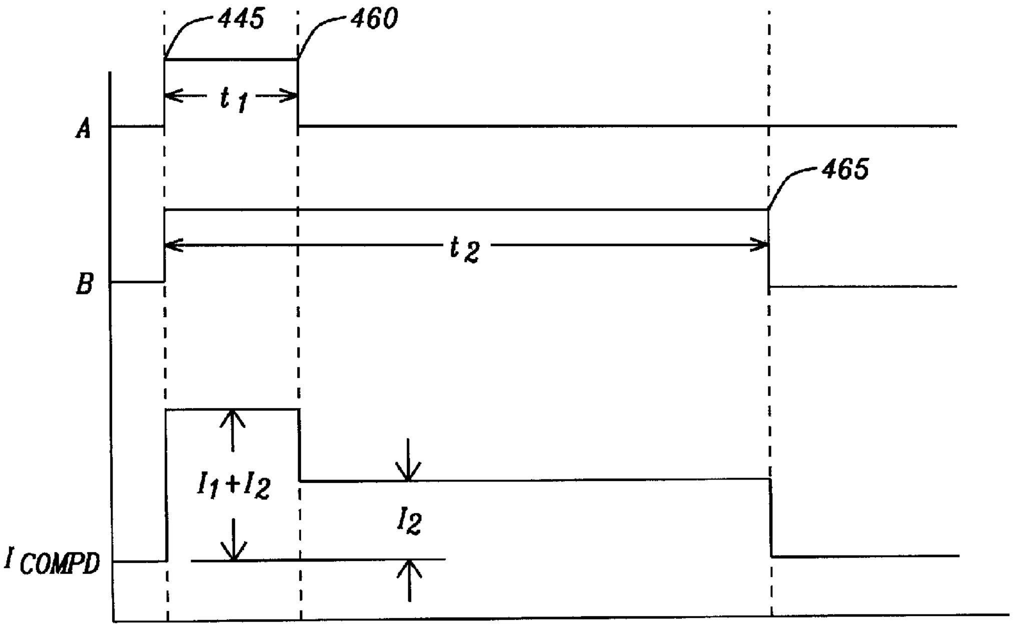
FIG. 11 is a plot comparing the digital profile compensation current and dielectric absorption relaxation current of the capacitor dielectric absorption compensation circuit of the present disclosure.
Figure 12:
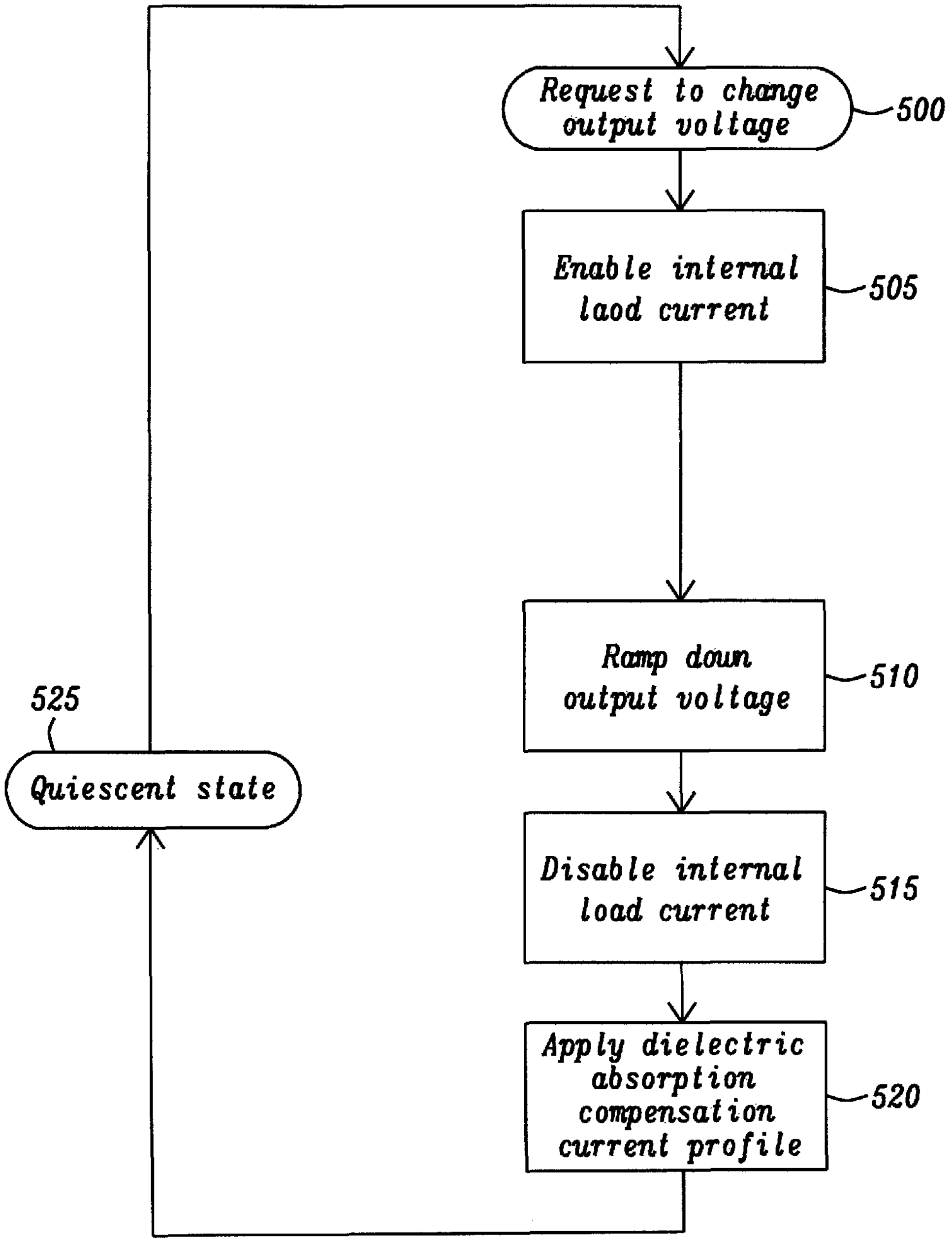
FIG. 12 is a flowchart for a method for operating a dynamic voltage controlled low dropout voltage regulator with a capacitor dielectric absorption compensation circuit of the present disclosure.

FIG. 11 is a plot of the comparing the digital profile compensation current $I_{COMPD}$ and dielectric absorption relaxation current of the capacitor dielectric absorption compensation circuit. Refer now to FIGS. 10 and 11 for a discussion of the operation of the digital embodiment of the dielectric absorption current compensation circuit 405. It should be noted that the structure of the digital embodiment of the dielectric absorption current compensation circuit 405 is essentially the structure of a two-bit digital-to-analog converter. Therefore, the current that is sunk from the output voltage terminal 135 is determined by the output voltage level $V_{OUT}$, the first current determining resistor $R_1$ and the second current determining resistor $R_2$. The state of the first data bit A and the second data bit B governs the digital dielectric absorption profile current $I_{COMP}$ as the sum of the currents $I_1$ and $I_2$. If first data bit A and the second data bit B are set to a first data state such that the first switching transistor $M_{11}$ and the second switching transistor $M_{12}$ are turned off (A=B=0), the digital profile compensation current $I_{COMPD}$ is equal to the sum of the currents $I_1$ and $I_2$ that have a level of zero.

If the state is of the first data bit A is a first data state to turn on the first switching transistor $M_{11}$ and the second data bit B is a second data state that turns off the second switching transistor $M_{12}$ (A=1, B=0), the digital profile compensation current $I_{COMPD}$ is equal to the current $I_1$ and the current $I_2$ has a level of zero. If the state is of the first data bit A is the second data state to turn off the first switching transistor $M_{11}$ and the second data bit B is the first data state that turns on the second switching transistor $M_{12}$ (A=0, B=1), the digital profile compensation current $I_{COMPD}$ is equal to the current $I_1$ and the current $I_2$ has a level of zero. If the state is of the first data bit A and the second data bit B is the first data state such that the first switching transistor $M_{11}$ and the second switching transistor $M_{12}$ are turned on (A=B=1), the digital profile compensation current $I_{COMPD}$ is equal to the sum of the level of the currents $I_1$ and $I_2$.

When the adjustable internal load current source 225 has completed the ramping of the output voltage level $V_{OUT}$ to the lower voltage level, the first and second data bits A and B are set to the first data state such that the first switching transistor $M_{11}$ and the second switching transistor $M_{12}$ are turned on (A=B=1) for the time period $t_1$. The digital profile compensation current $I_{COMPD}$ is rises 455 to be equal to the sum of the level of the currents $I_1$ and $I_2$. At the end 460 of the time period $t_1$, the first data bit A becomes set to the second data state and the first switching transistor $M_{11}$ is turned off the and the second data bit B remains at the first data state to keep the second switching transistor $M_{12}$ (A=0, B=1) turned on. The digital profile compensation current $I_{COMPD}$ falls at the end 460 of the time period $t_1$ to be equal to the level of the current $I_2$. The second switching transistor $M_{12}$ remains turned on until the end 465 of the time period $t_2$. At the end of the end 465 of the time period $t_2$, the first data bit A and the second data bit B are set to the first data state such that the first switching transistor $M_{11}$ and the second switching transistor $M_{12}$ are turned off (A=B=0) and the digital profile compensation current $I_{COMPD}$ brought to a level of zero.

While the current $I_1$ and the current $I_2$ are shown to be equal in the embodiments as shown, the current $I_1$ and the current $I_2$ in various embodiments may have different levels. Further, in other embodiments, there may be any number data bits with attendant switching transistors and current determining resistors connected as described above. This permits generating a digital profile compensation current $I_{COMPD}$ that more nearly simulates a mirror current of the dielectric absorption relaxation current.

FIG. 10 is a flowchart for a method for operating a dynamic voltage controlled low dropout voltage regulator with a capacitor dielectric absorption compensation circuit. An apparatus that performs this method such as the low dropout voltage regulator 400 with a dynamic voltage control circuit 110 including a dielectric absorption current profile compensation circuit 405, begins by receiving (Box 500) a request to change the output voltage of the low dropout voltage regulator. The dynamic voltage control circuit 110 activates (Box 505) the adjustable internal load current source 225 to cause the output voltage level $V_{OUT}$ to decrease (Box 510). When the output voltage level $V_{OUT}$ has reached it new lower level, the adjustable internal load current source 225 is disabled (Box 515) and the dielectric absorption current profile compensation circuit 405 is activated (Box 520) to generate the dielectric absorption profile current $I_{COMPD}$ to compensate for the current caused by the recharging of the output capacitor $C_{OUT}$ because of dielectric absorption. When the dielectric absorption has been completed, the dielectric absorption current profile compensation circuit 405 is deactivated and the low dropout voltage regulator assumes (Box 520) a quiescent state.

While this disclosure has been particularly shown and described with reference to the preferred embodiments thereof, it will be understood by those skilled in the art that various changes in form and details may be made without departing from the spirit and scope of the disclosure.

What is claimed is:

1. A low dropout voltage regulator comprising:

an analog dielectric absorption current compensation circuit providing an analog profile compensation current mirroring the dielectric absorption current that is applied to an output of the low dropout voltage regulator and in parallel with a load capacitor to compensate for the dielectric absorption current comprising:

an analog profile current generator that generates the analog profile compensation current and in communication with the output of the low dropout voltage regulator for transferring the analog profile compensation current to the load capacitor to compensate for the dielectric absorption current;

a first switch with a first terminal connected to an output of the programmable current source and a second terminal;

a diode-connected transistor having a commonly connected drain and gate connected to the second terminal of the first switch;

a ballast timing capacitor having a first plate connected to the drain and gate of the diode-connected transistor and a second plate connected to the ground reference voltage source for controlling the profile of the profile compensation current within the dielectric absorption compensation circuit;

a second switch having a first terminal connected to the commonly connected drain and gate of the diode-connected transistor and second terminal;

a second transistor having a gate connected to the second terminal of the second switch, a drain connected to an output of the low dropout regulator and in parallel with the output capacitor of the low dropout regulator; and a third switch having a first terminal connected to the gate of the second transistor and the second terminal of the second switch and a second terminal connected to the ground reference voltage source;

wherein when the output of the low dropout regulator is disabled and the output voltage level is placed at a lower voltage level and the voltage across the output capacitor of the low dropout voltage regulator will begin to recharge and the output voltage will begin to rise, the second switch will activate and the first and third switches will deactivate, the ballast timing capacitor will discharge through the diode-connected transistor to cause the second transistor to source the profile compensation current with a magnitude that matches the current generated at the output capacitor recharges to the output of the low dropout regulator to counteract the current generated by the recharging of the output capacitor.

2. The low dropout voltage regulator of claim 1 wherein when the low dropout regulator is in a steady state the first switch is activated to close the connection from the profile current source to the diode-connected transistor, the second switch is deactivated to disconnect the gate of the second transistor from the drain and gate of the diode-connected transistor, and the third switch is activated to connect the gate of the second transistor to the ground reference voltage source.

3. An analog dielectric absorption current compensation circuit for generating an analog profile compensation current mirroring the dielectric absorption current that is applied to an output of a low dropout voltage regulator and in parallel with a load capacitor to compensate for the dielectric absorption current comprising:

a profile current generator that generates the analog profile compensation current and in communication with the output of the low dropout voltage regulator for transferring the analog profile compensation current to the load capacitor to compensate for the dielectric absorption current, comprising:

a first switch with a first terminal connected to an output of the programmable current source and a second terminal;

a diode-connected transistor having a commonly connected drain and gate connected to the second terminal of the first switch;

a ballast timing capacitor having a first plate connected to the drain and gate of the diode-connected transistor and a second plate connected to the ground reference voltage source for controlling the profile of the profile compensation current within the dielectric absorption compensation circuit;

a second switch having a first terminal connected to the commonly connected drain and gate of the diode-connected transistor and second terminal;

a second transistor having a gate connected to the second terminal of the second switch, a drain connected to an output of the low dropout regulator and in parallel with the output capacitor of the low dropout regulator; and a third switch having a first terminal connected to the gate of the second transistor and the second terminal of the second switch and a second terminal connected to the ground reference voltage source;

wherein when the output of the low dropout regulator is disabled and the output voltage level is placed at a lower voltage level and the voltage across the output capacitor of the low dropout voltage regulator will begin to recharge and the output voltage will begin to rise, the second switch will activate and the first and third switches will deactivate, the ballast timing capacitor will discharge through the diode-connected transistor to cause the second transistor to source the profile compensation current with a magnitude that matches the current generated as the output capacitor recharges to the output of the low dropout regulator to counteract the current generated by the recharging of the output capacitor.

4. The dielectric absorption current compensation circuit of claim 3 wherein when the low dropout regulator is at a steady state the first switch is activated to close the connection from the profile current source to the diode-connected transistor, the second switch is deactivated to disconnect the gate of the second transistor from the drain and gate of the diode-connected transistor, and the third switch is activated to connect the gate of the second transistor to the ground reference voltage source.

5. A digital dielectric absorption current compensation circuit for generating a digital profile compensation current mirroring the dielectric absorption current that is applied to an output of a low dropout voltage regulator and in parallel with a load capacitor to compensate for the dielectric absorption current comprising:

a profile current generator that generates the digital profile compensation current and in communication with the output of the low dropout voltage regulator for transferring the digital profile compensation current to the load capacitor to compensate for the dielectric absorption current, comprising:

a digital-to-analog circuit receive a plurality of data bits and generating the digital profile compensation current wherein each data bit represents a current level such that all the current levels are summed together based on a data state of applied to the data bits.

6. The dielectric absorption current compensation circuit of claim 5 wherein the digital-to-analog circuit comprises:

a plurality of switching transistors connected such that a gate of each of the switching transistors received one of the plurality of data bits, the sources of the switching transistors are commonly connected to a ground reference voltage source; and a plurality of current determining resistors, wherein a drain of each of the plurality of switching transistors is connected to a first terminal of one of the plurality of current determining resistors and second terminals of the current determining resistors are commonly connected to the output of the low dropout voltage regulator for transferring the digital profile compensation current to the load capacitor to compensate for the dielectric absorption current.

7. The dielectric absorption current compensation circuit of claim 6 wherein when all of the data bits are at a first data state all of the plurality of switching transistors are turned on and the digital profile compensation current is a maximum current level.

8. The dielectric absorption current compensation circuit of claim 7 wherein when all of the data bits are at a second data state all of the plurality of switching transistors are turned off and the digital profile compensation current is a zero current level.

9. The dielectric absorption current compensation circuit of claim 8 wherein when any of the data bits are at a first data state those of the plurality of switching transistors with gates at the first data state are turned on, those of the plurality of switching transistors with gates at the second data state are turned off, and the digital profile compensation current is a current level equal to the sum of the current through each of those of the plurality of switching transistors with gates at the first data state and turned on.

10. The dielectric absorption current compensation circuit of claim 8 wherein digital profile compensation current is formed by selectively setting the data bits to the first data state to approximate the dielectric absorption current.

11. The low dropout voltage regulator comprising:

a digital dielectric absorption current compensation circuit for generating a digital profile compensation current mirroring the dielectric absorption current that is applied to an output of a low dropout voltage regulator and in parallel with a load capacitor to compensate for the dielectric absorption current comprising:

a profile current generator that generates the digital profile compensation current and in communication with the output of the low dropout voltage regulator for transferring the digital profile compensation current to the load capacitor to compensate for the dielectric absorption current, comprising:

a digital-to-analog circuit receive a plurality of data bits and generating the digital profile compensation current wherein each data bit represents a current level such that all the current levels are summed together based on a data state of applied to the data bits.

12. The low dropout voltage regulator of claim 11 wherein the digital-to-analog circuit comprises:

a plurality of switching transistors connected such that a gate of each of the switching transistors receives one of the plurality of data bits, the sources of the switching transistors are commonly connected to a ground reference voltage source; and a plurality of current determining resistors, wherein a drain of each of the plurality of switching transistors is connected to a first terminal of one of the plurality of current determining resistors and second terminals of the current determining resistors are commonly connected to the output of the low dropout voltage regulator for transferring the digital profile compensation current to the load capacitor to compensate for the dielectric absorption current.

13. The low dropout voltage regulator of claim 12 wherein when all of the data bits are at a first data state all of the plurality of switching transistors are turned on and the digital profile compensation current is a maximum current level.

14. The low dropout voltage regulator of claim 13 wherein when all of the data bits are at a second data state all of the plurality of switching transistors are turned off and the digital profile compensation current is a zero current level.

15. The low dropout voltage regulator of claim 14 wherein when any of the data bits are at a first data state those of the plurality of switching transistors with gates at the first data state are turned on, those of the plurality of switching transistors with gates at the second data state are turned off, and the digital profile compensation current is a current level equal to the sum of the current through each of those of the plurality of switching transistors with gates at the first data state and turned on.

16. The low dropout voltage regulator of claim 15 wherein digital profile compensation current is formed by selectively setting the data bits to the first data state to approximate the dielectric absorption current.

17. A method for compensating for the dielectric absorption current from the recharging of the output load capacitor of a low dropout voltage regulator comprising the steps of:

requesting the low voltage regulator to decrease its output voltage;

enabling an internal load current source to decrease the output voltage of the low dropout voltage regulator by adjusting the charge of the output load capacitor;

ramping down an output voltage level of the low dropout voltage regulator until it brought to a lower voltage level;

disabling the internal load voltage source; and applying a profile compensation current after the low dropout voltage regulator is disabled to counteract the dielectric absorption current of the recharging output load capacitor to prevent the low dropout voltage regulator from becoming unregulated.

18. The method for compensating for the dielectric absorption current of claim 17 wherein applying the profile compensation current comprises the steps of:

generating a continuous profile compensation current and applying the continuous profile compensation current to the output of the low dropout regulator.

19. The method for compensating for the dielectric absorption current of claim 17 wherein applying the profile compensation current comprises the steps of:

generating a digital profile compensation current and applying the digital profile compensation current to the output of the low dropout regulator.

20. An apparatus for compensating for the dielectric absorption current from the recharging of the output load capacitor of a low dropout voltage regulator comprising:

means for requesting the low voltage regulator to decrease its output voltage;

means for enabling an internal load current source to decrease the output voltage of the low dropout voltage regulator by adjusting the charge of the output load capacitor;

means for ramping down an output voltage level of the low dropout voltage regulator until it brought to a to a lower voltage level;

means for disabling the internal load voltage source; and means for applying a profile compensation current after the low dropout voltage regulator is disabled to counteract the dielectric absorption current of the recharging output load capacitor to prevent the low dropout voltage regulator from becoming unregulated.

21. The apparatus for compensating for the dielectric absorption current of claim 20 wherein the means for applying the profile compensation current comprises:

means for generating a continuous profile compensation current and means for applying the continuous profile compensation current to the output of the low dropout regulator.

22. The apparatus for compensating for the dielectric absorption current of claim 20 wherein means for applying a profile compensation current comprises:

means for generating a digital profile compensation current and means for applying the digital profile compensation current to the output of the low dropout regulator.

* * * * *